US006105861A

United States Patent [19]

Kuit

[11] Patent Number: 6,105,861

[45] Date of Patent: Aug. 22, 2000

[54] METHOD FOR PROCESSING CARDS IN CONJUNCTION WITH CARD PROCESSING SYSTEMS

[75] Inventor: Alex Kuit, Paderborn, Germany

[73] Assignee: ORGA Kartensysteme GmbH, Paderborn, Germany

[21] Appl. No.: 09/130,656

[22] Filed: Aug. 7, 1998

[30] Foreign Application Priority Data

Aug. 7, 1997 [DE] Germany .......................... 197 34 119

[51] Int. Cl.[7] .................................................... G06F 17/00

[52] U.S. Cl. ........................ 235/375; 209/583; 209/900; 270/52.02

[58] Field of Search .................................. 235/375, 380, 235/435, 474, 475; 209/583, 577, 547, 900; 270/52.02, 52.04

[56] References Cited

U.S. PATENT DOCUMENTS

| | | | |
|---|---|---|---|
| 3,262,696 | 7/1966 | Zuercher | 270/52.02 |
| 4,034,210 | 7/1977 | Hill et al. | 235/487 |
| 4,467,209 | 8/1984 | Maurer et al. | 235/487 |
| 4,825,054 | 4/1989 | Rust et al. | 235/380 |
| 4,866,259 | 9/1989 | Bonnemoy | 235/475 |
| 5,541,395 | 7/1996 | Hill et al. | 235/380 |
| 5,923,015 | 7/1999 | Hill et al. | 235/380 |

FOREIGN PATENT DOCUMENTS

| | | |
|---|---|---|
| 30 49 607 | 7/1982 | Germany . |
| 87/01232 | 2/1987 | WIPO . |

OTHER PUBLICATIONS

Orga, Overview of personalisation systems, The Smart Card Integrator, 2 pages, month & year missing.

Elektronikpraxis Nr 27, Jun. 1995.

*Primary Examiner*—Michael G Lee
*Assistant Examiner*—Diane I. Lee
*Attorney, Agent, or Firm*—Foley & Lardner

[57] ABSTRACT

A method for use in card processing systems which includes at least one supply magazine for accommodating the cards to be processed, at least one processing station for applying the data to the respective card, and at least one storage magazine for accommodating properly processed cards. The cards are processed in accordance with a processing list which contains the data to be applied to the respective card. A check is carried out as to whether a card has been properly processed. The properly processed cards are stored in a defined sequence, while the cards which have not been properly processed are rejected. The storage sequence of the properly processed cards is automatically checked, and in case of the detection of a gap in the storage sequence, a marking device for identifying the sequence gap is set.

15 Claims, 7 Drawing Sheets

Fig. 4

| Processing List | |
|---|---|
| Card Number | Data |
| 1 | $XYZ_1$ |
| 2 | $XYZ_2$ |
| 3 | $XYZ_3$ |
| • • • | • • • |
| j | $XYZ_j$ |
| j+1 | $XYZ_{j+1}$ |
| • • • | • • • |
| N | $XYZ_N$ |

Fig. 5

| Marking List | | |
|---|---|---|
| Marking Card No. | Card No. | Data |
| 1/Red | 51 | $XYZ_{51}$ |
| 2/Blue | 340 | $XYZ_{340}$ |
| 3/Green | 341 | $XYZ_{341}$ |
| 4/Yellow | 372 | $XYZ_{372}$ |

METHOD FOR PROCESSING CARDS IN CONJUNCTION WITH CARD PROCESSING SYSTEMS

FIELD OF THE INVENTION

The invention relates to a method for processing cards in conjunction with card processing systems (so-called card personalization system). In particular, the invention relates to a method for the application of card-specific and/or user-specific data to cards in accordance with a processing list. The cards to be processed are chip and/or magnetic stripe cards as are in circulation today in great numbers in the form of bank cards, or plain cards without a data carrier (in the form of a semiconductor chip or a magnetic stripe) onto which data is applied to the card body only, for example, by printing, laser inscription or raised embossing.

BACKGROUND OF THE INVENTION

A method for the application of data onto chip and/or magnetic stripe cards is known from DE 30 49 607 C1. With this method, the cards which are removed from a card supply magazine, which contains the cards to be processed, successively travel through a chip and/or magnetic stripe processing station first where changeable data is recorded on the chip and/or the magnetic stripe and then through a card body processing station where the unchangeable data is applied to the card body, for example, by printing, laser inscription or raised embossing. After the recording of the data onto the chip and/or the magnetic stripe a check is carried out as to whether recording has been effected properly. This can be done in the chip and/or the magnetic stripe processing station or in a separate inspection station. Cards on which data recording was not carried out properly will not be supplied to the card body processing station but will be rejected. Immediately after the detection of the error a still unprocessed card is provided and the data which was recorded in an incorrect/incomplete manner is recorded on the new card, and thus a properly processed card is produced. This card is then placed into a storage magazine for properly processed cards. In this manner, a contiguous serial storage of the properly processed cards is achieved. The sequence of the cards placed into the storage magazine for "accept cards" corresponds to the sequence of the data sets recorded in the system in accordance with the processing list.

It is mandatory to maintain the correct sequence of the cards if this is a condition for subsequent automated processing steps (e.g. shipping facilities for the cards).

Though the method according to DE 30 49 607 C1 which is known from the state of the art ensures contiguous serial storage of the properly processed cards, it has, nevertheless, limitations and drawbacks which will be explained in the following.

In a system with two successively arranged processing stations ($1^{st}/2^{nd}$ station), the supply of an unprocessed virgin card for the immediate reproduction of a card with the data record of a "reject card" is based on the condition that always only one card is located in the processing stations. Otherwise, the "supply route" for the card to be reproduced will be blocked if another data record is already applied to the next card in the first processing station at a time at which the verification of the processing operation in the previous processing station is not yet completed. The fact that recording of the next data record for the next card to be processed may not commence as long as a card is still being processed and checked, however, reduces the card throughput disadvantageously.

If it is permitted that processing of the next card already commences when a eard is still being processed, then both cards—the incorrect card and the card in the direction of the processing sequence whose processing has already started—must be rejected in the case of a card which was not processed properly in order to clear the "supply route" for the virgin card. This means, however, that additional card rejects are tolerated in order to maintain the storage sequence of the properly processed cards. This, however, is not acceptable.

In order to avoid undesired card rejects, the card whose processing has already commenced and which is blocking the supply route could be brought into a separate parking device and thus be removed from the actual processing sequence until the card to be reproduced has passed the processing sequence properly. This, however, necessitates disadvantageous additional design efforts for the card personalization system.

In order to increase the card throughput, card personalization systems are increasingly being employed wherein multiple processing stations are incorporated so that a parallelization of processing steps is effected. The above described problem of maintaining a defined storage sequence in the case of the occurrence of processing errors with these systems is considerably more complex compared to the system known from DE 30 49 607 C1 where only one or two processing stations are provided which are arranged downstream of one another in the processing direction.

SUMMARY OF THE INVENTION

In view of this background, it is the object of the invention to develop a method for the processing of cards which in a simple and cost-effective manner ensures a defined storage sequence of the properly processed cards even in the case of the occurrence of incorrect cards.

Briefly, the present invention comprises, in one aspect, a method for processing cards in conjunction with a card processing system, wherein the card processing system comprises at least one supply magazine for accommodating the cards to be processed, at least one processing station for applying the data to a respective card, and at least one storage magazine for accommodating properly processed cards, comprising the following steps: processing cards in said card processing system in accordance with a processing list which includes the data to be applied to the respective cards; determining whether a card has been properly processed; storing properly processed cards in a defined sequence; rejecting cards which are not properly processed; automatically checking a storage sequence of the properly processed cards; and in the case of detection of a gap in the storage sequence, setting a marking device for identifying the sequence gap.

In a further aspect of the present invention, the method includes the step of, upon the detection of a gap in the storage sequence, automatically requesting a system operator to set the marking device.

In a yet further aspect of the present invention, the marking device setting step comprises the step of automatically marking and inserting an incorrectly processed card into the series of the properly processed cards as a marking device for identifying the sequence gap.

In a further aspect of the present invention, the marking device setting step comprises the step of storing the marking devices in accordance with a marking list, with each marking device being assigned the card number corresponding to the sequence gap from the list of the cards to be processed.

In yet another aspect of the present invention, the method further comprises the step of inserting a properly processed card for which a marking device has been set into the storage sequence and removal of the marking device by automatically determining which marking device is assigned to the properly processed card.

In a yet further aspect of the present invention, the inserting step comprises the step of automatically requesting an operator of the system to insert a properly processed card for which a corresponding marking device is set into the storage sequence upon removal of the marking device.

In yet another aspect of the present invention, the method includes the step of inserting a properly processed card for which a marking device has been set into the storage sequence and removal of the marking device only after the entire processing list has been executed.

In yet a further aspect of the present invention, upon the detection of a gap in the storage sequence, a marking device in the form of a pointer movable along the storage magazine is automatically set at the gap in the storage sequence.

BRIEF DESCRIPTION OF THE DRAWINGS

The invention and its embodiments will be described and the advantages discussed with reference to the accompanying drawings in which:

FIG. 4 is a processing list.

FIG. 5 is a marking list.

DETAILED DESCRIPTION OF THE PREFERRED EMBODIMENT

Reference is now made to the drawings. For a better understanding of the method, an example of a complex card processing system in which the method is to be employed will be described first, comprising two processing stations (3, 4) of different processing types with a multiple of each of these processing stations being provided. U.S. patent application Ser. No. 09/035,853, filed Mar. 6, 1998, entitled "System For Processing Chip And/Or Magnetic Strip Cards," by Meyer-Wittreck, Krupke, and Robke; Ser. No. 09/035,854, filed Mar. 6, 1998, entitled "Unit For Processing Chip And/Or Magnet Strip Cards," by Meyer-Wittreck, Ruibbelke, Krupke, Robke, and Banse; and Ser. No. 09/035,855, filed Mar. 6, 1998, entitled "System For Processing Chip And/Or Magnetic Strip Cards," by Meyer-Wittreck, Ruibbelke, Krupke, and Robke; are hereby incorporated by reference.

Figure 1:
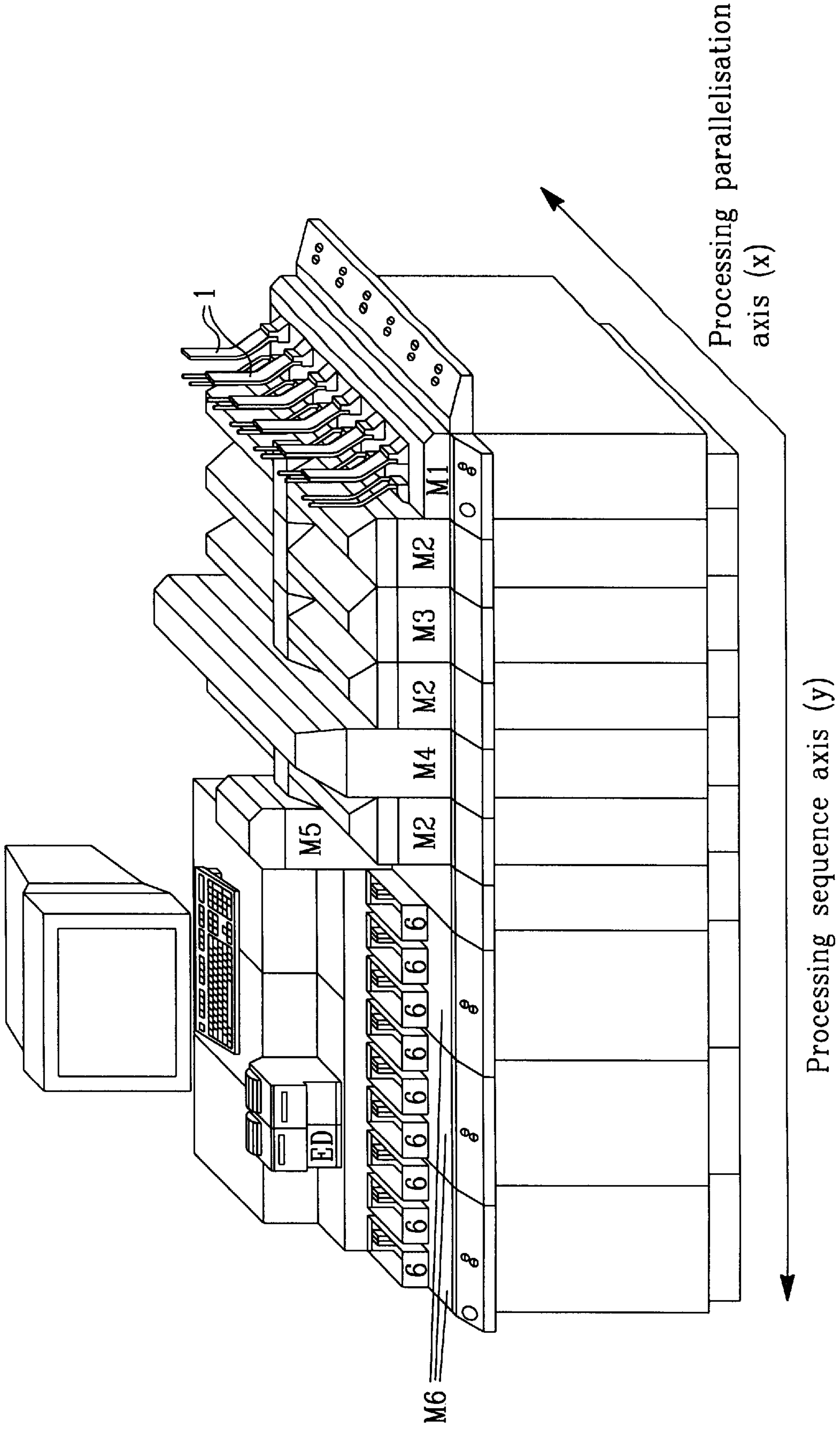
FIG. 1 is a perspective view of the card personalization system.
Figure 2:
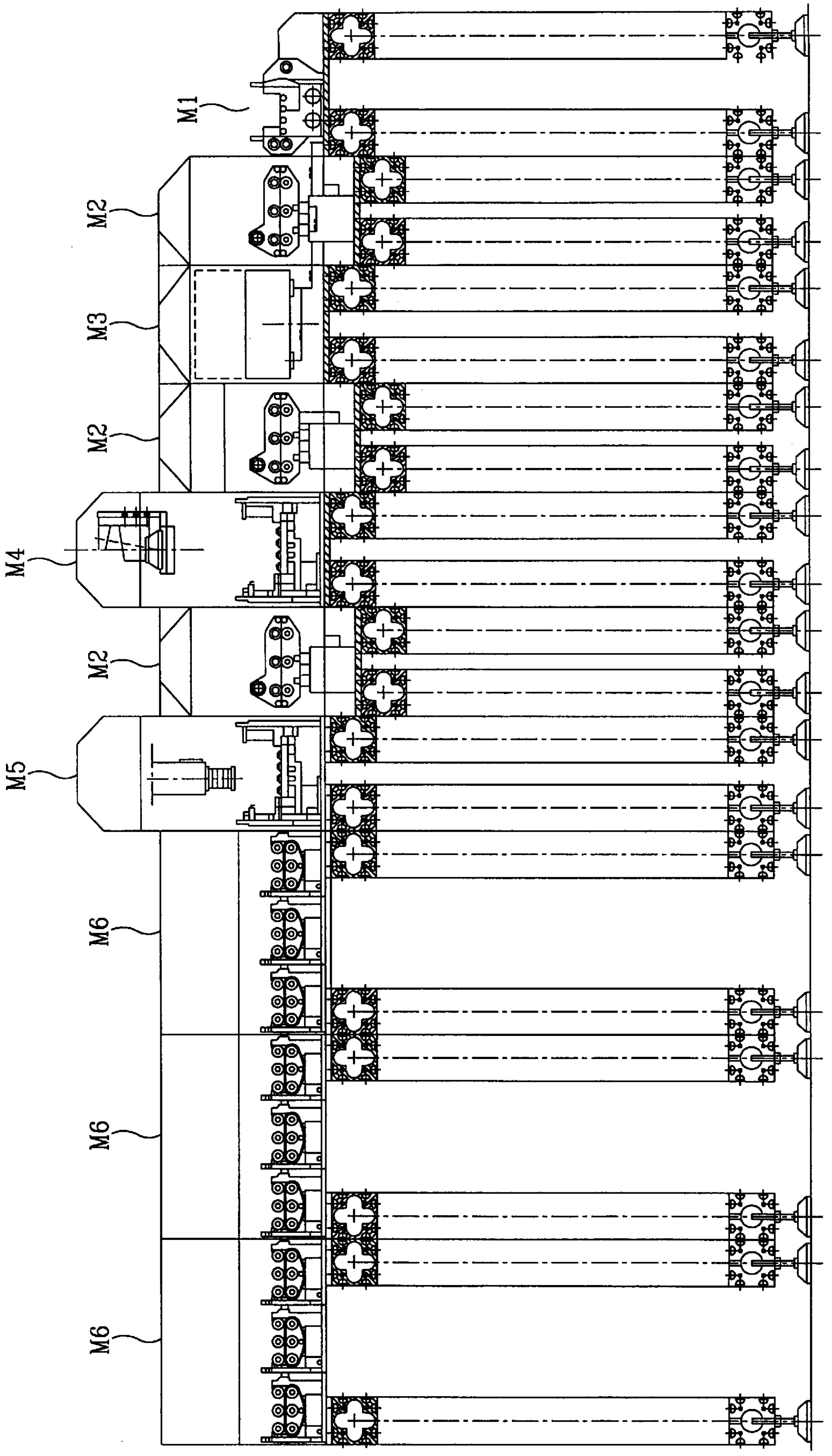
FIG. 2 is a side view of the card personalization system.
Figure 3:
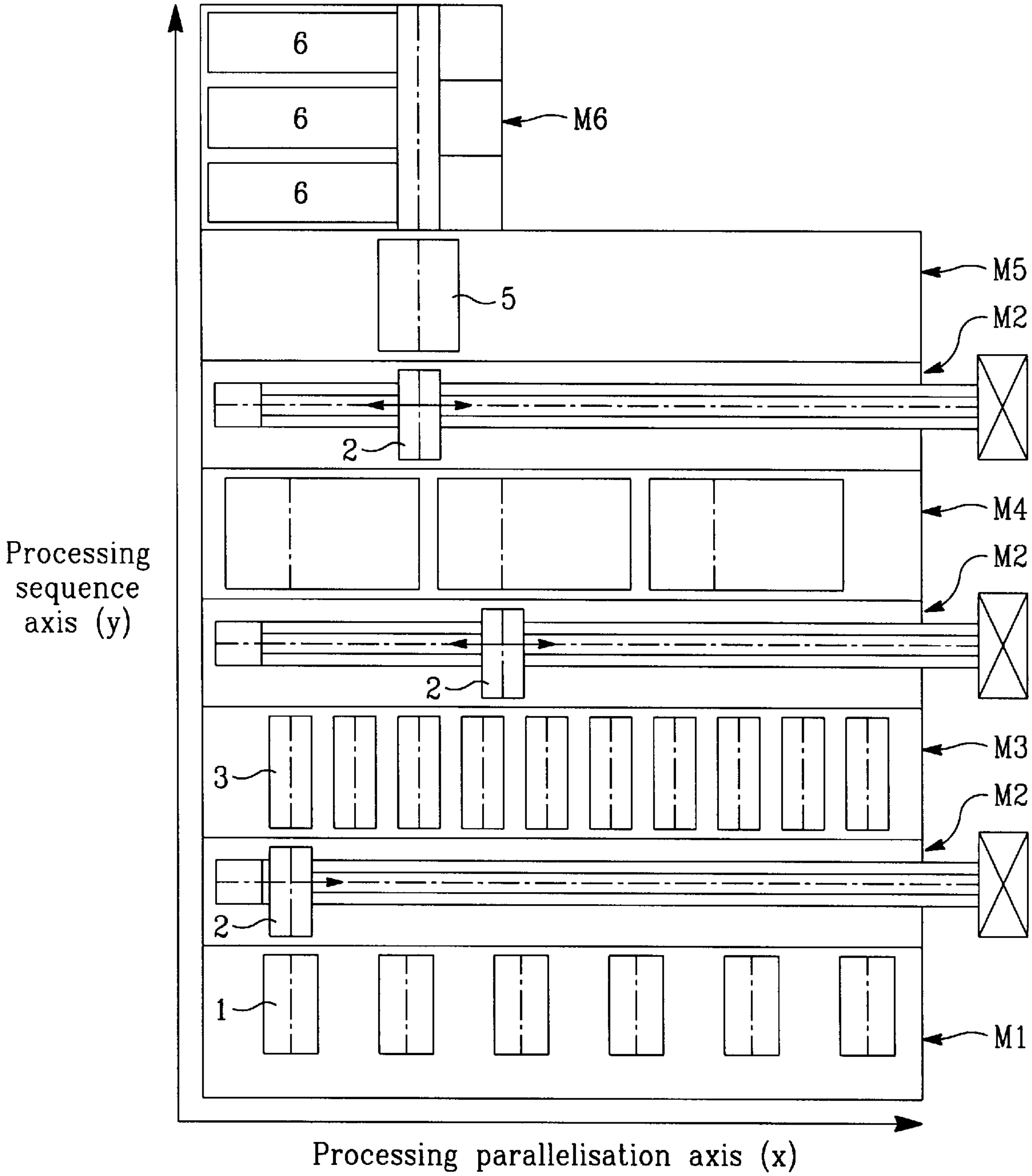
FIG. 3 is a schematic plan view of the system components.
Figure 6:
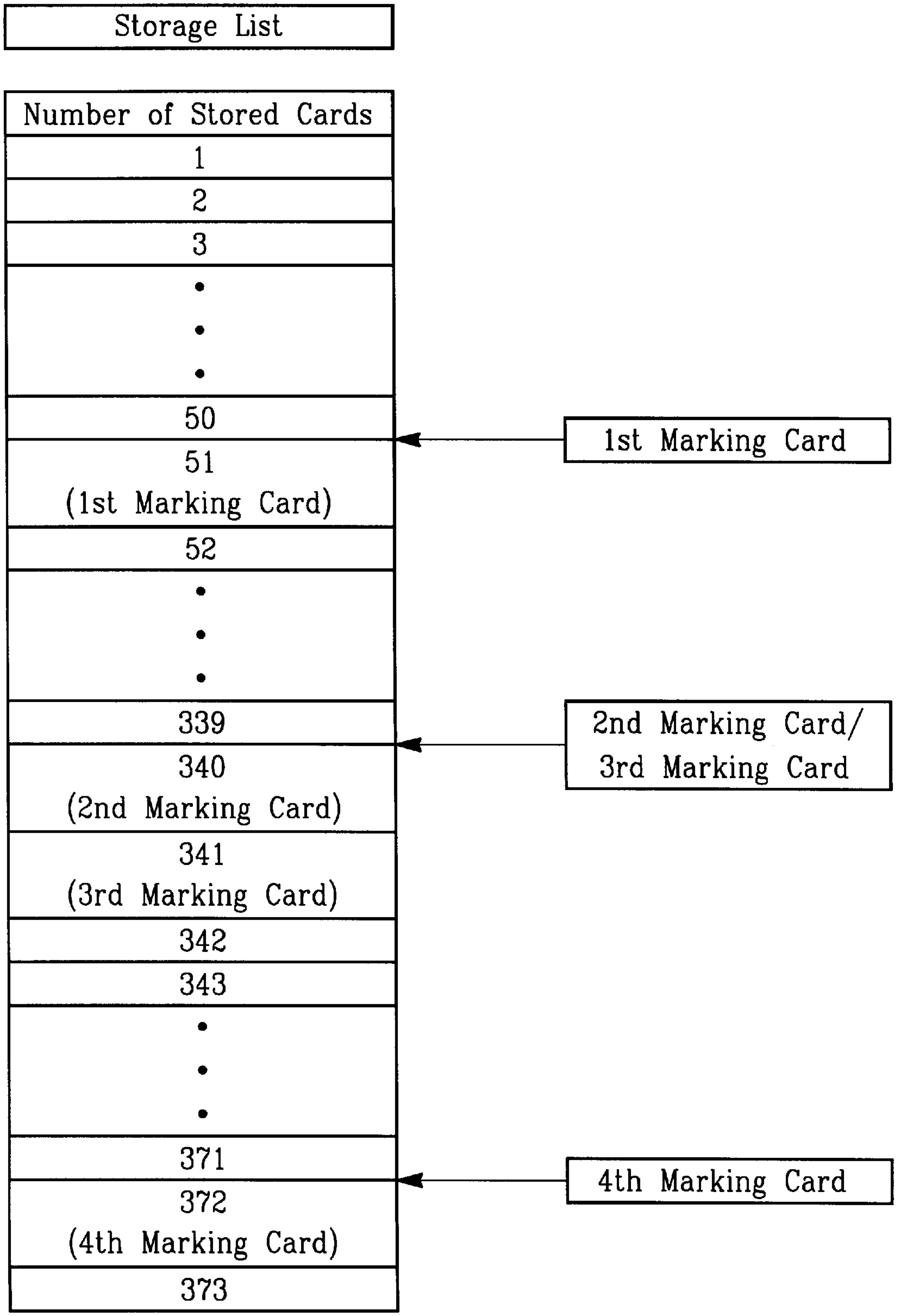
FIG. 6 is a storage list.
Figure 7:
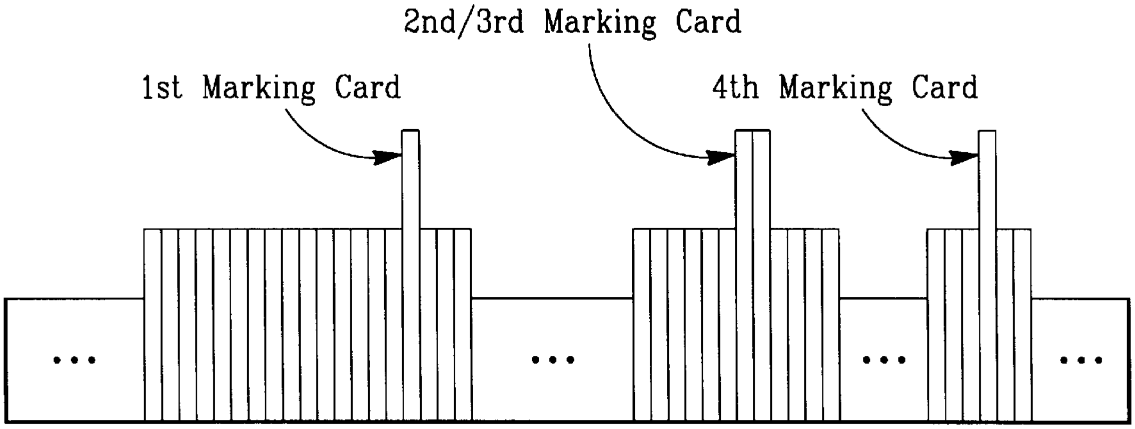
FIG. 7 is a section (not to scale) through a storage magazine with properly stored cards and marking cards.

The system comprises a card transport plane (x, y) with a processing sequence axis (y) and a processing parallelisation axis (x). See FIGS. 1 and 3. Processing stations (3, 4) of different processing types are arranged in spaced relationship downstream of one another along the processing sequence axis (y) and multiple processing stations (3, 4) of one processing type are arranged in parallel adjacent to each other along the processing parallelisation axis (x) as a processing module (M3, M4).

Upstream and downstream of a processing module (M3, M4) consisting of two or more processing stations (3, 4) of the same processing type, at least one card distribution device (2) each is arranged in the direction of processing which is associated with the card transport system and which is movable along the processing parallelisation axis (x) and which is capable of receiving a card from a card supply magazine (1) or a processing station (3, 4), accommodating it or discharging it to a processing station (3, 4), respectively, after moving into a card receipt or a card discharge position, respectively.

The embodiment of the inventive system as illustrated in the drawings comprises ten chip and/or magnetic stripe processing stations (3), three laser inscription stations (4) as card body processing stations for the application of the unchangeable data to the card body, as well as six card supply magazines (1) with an integrated device for separating the magazine contained cards. The six card supply magazines (1) are in turn integrated in one card supply module (M1).

Each chip and/or magnetic stripe processing station (3) is capable of verifying the correctness of the recorded data in a known manner. Cards which are determined herein as incorrect are automatically rejected and transported into a reject magazine (6) for "incorrect cards". Downstream of the laser stations (4) an additional image recognition station (5) is arranged in the processing direction in a system module (M5) for verifying the correctness and quality of the data/information applied to the card body. After the completed image evaluation a decision is automatically made as to whether a card (K) will be transported into a storage magazine (6) for correctly processed cards or into a reject magazine (6) for "incorrect cards".

In the embodiment, nine card storage magazines (6) are provided, three of which are combined to form one card storage module (M6). Which of the storage magazines (6) are used for the properly processed, i.e. the "accept cards", and which are used for the incorrect cards can flexibly be determined by the user of the system via the system controller.

The cards (K) are now processed in accordance with a processing list—see also FIG. 4—in which the data record XYZ to be applied to each card (K) is stored. According to the invention, the storage sequence of the properly processed cards is checked thereby. Upon the detection of a gap in the storage sequence, marking means are employed for the identification of the sequence gap. This identification of sequence gaps ensures a defined storage sequence of the properly processed cards.

The method will now be explained on the basis of the following example:

It is assumed that the first 50 data records from the processing list have been properly executed and stored; accordingly, 50 cards are located in the storage magazine. The number of the card last stored is 50. This number is stored in a corresponding storage list by the system controller.

If, for example, an error occurs in the chip and/or magnetic stripe processing station (3) during processing of the card which is intended for the 51st data record from the processing list, this card travels through the system without any further processing and is placed into the reject magazine (6). In the meantime, card number 52 has been properly processed and is to be placed into the storage magazine (6) for the "accept cards". The system controller now automatically checks whether the number of this card (j=52) equals the number (i=50) of the card last placed into the storage magazine (6) for accept cards plus one: j=i+1? This is not the case.

The following inquiry j>i+1? is true, and the card is placed into the storage magazine (6) for the "accept cards". Subsequently, processing is stopped, with cards being located in one of the processing stations (3, 4) being completed but not transported. In addition, a signal is output to the operator of the system, which indicates that a sequence error has occurred and requests the insertion of a marking card between the two cards (50, 52) last stored. The operator inserts the marking card and confirms this to the system controller. The number of the card stored last (j=i 52) is then stored as a comparison value for the card to be stored next, and normal operation of the system is resumed.

If further processing errors occur in the course of card processing, the sequence gaps are identified by further marking cards.

If, at any time, e.g. after the card with the data record no. 373 has been stored, a card with the data record no. 51 is properly reproduced, the system controller automatically detects a sequence violation ($j=51<i=373$), and processing of further cards is stopped (see above). With reference to a marking list, the system automatically determines for which marking card the reproduced card is to be exchanged. The system operator is then prompted "Reproduced card; please substitute the card last stored by marking no. . . . ". After substitution of the reproduced card by the marking card and confirmation by the operator, the normal processing operation of the system is resumed.

In one embodiment of the invention the marking cards themselves are also cards with the dimensions of the cards to be processed. For marking purposes, these are rotated through 90° relative to the properly stored cards and inserted "upright" into the storage magazine (6). The following convention applies to the numbering of the marking cards in the storage magazine (6) and in the marking list: the marking card which is inserted first when viewed from the end face of the storage magazine (6) facing towards the operator is considered to be marking card no. 1. This convention can, of course, be applied the other way round. A modification of this embodiment provides for the use of colored marking cards, with, for example, red corresponding to marking card no. 1, blue to marking card no. 2, etc. Another modification of this embodiment provides for visibly applying the marking numbers to the marking cards.

Figure 8:
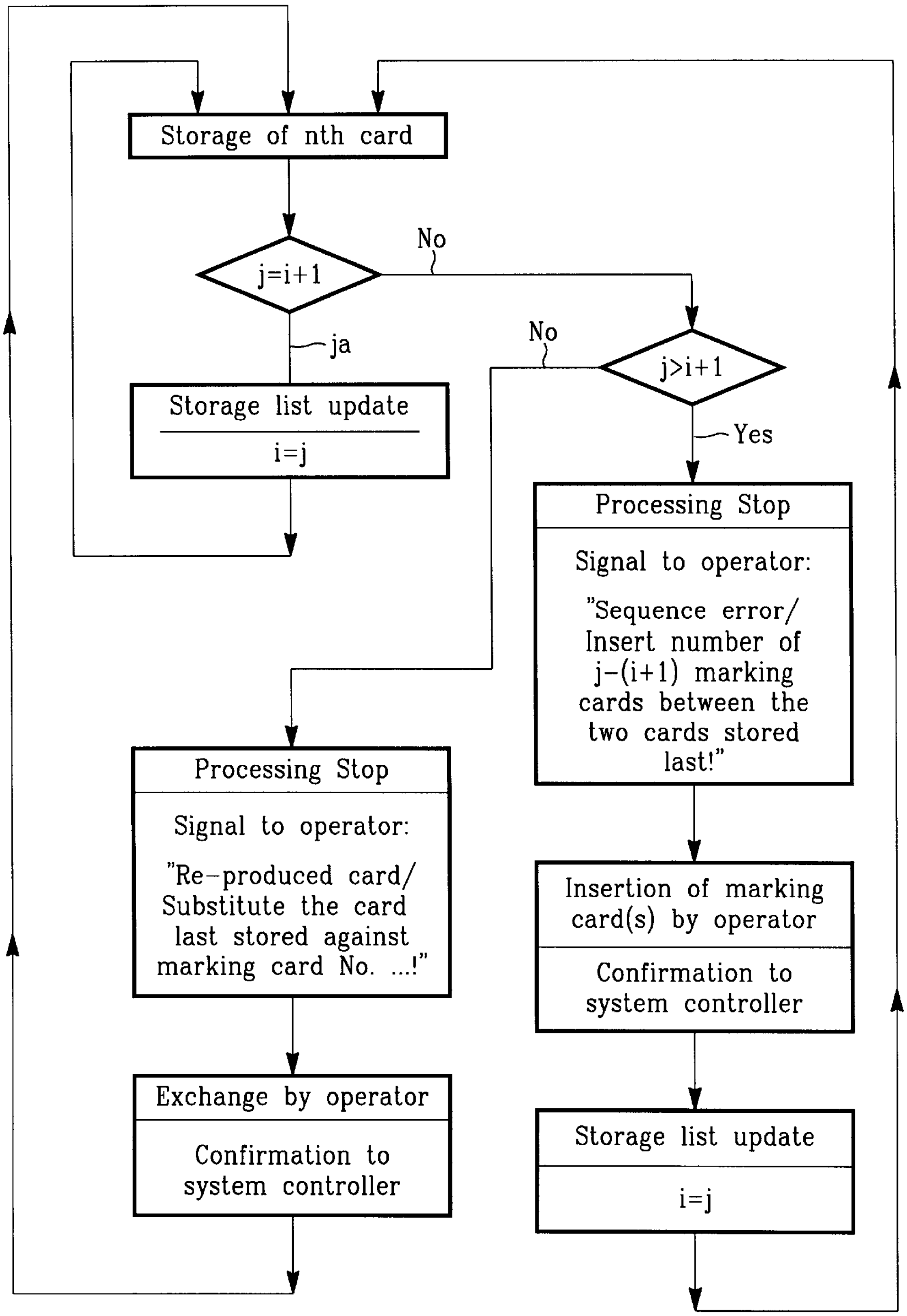
FIG. 8 is a flow diagram to illustrate the process sequence.

One embodiment of the process flow for the present invention is set forth in FIG. 8. This embodiment utilizes decision blocks based on the values of j and i.

In an alternative embodiment (not shown) of the invention the marking means are automatically set via corresponding devices of the system. This can, for example, be effected by means of corresponding pointers which are automatically movable along the storage magazine (6) and point to sequence gaps. A modification of this embodiment of the automatic setting of marking means (not shown) provides for automatic marking of each incorrect card and inserting same into the sequence of the properly processed cards as a marking means for identifying the sequence gap. This can be done, for example, by colored printing of a card edge which will later be visible in the storage magazine (6).

There are two variants for the process sequence of the reproduction of cards for which a marking means has been set. In the first variant all cards for which a marking means has been set are reproduced only then when the processing list has been executed. In the second variant it is permissible to reproduce the cards at any time during the execution of the processing list.

Finally, it should be emphasized that the core of the invention is the automatic verification of the storage sequence and the setting of marking means for the identification of sequence gaps.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method for processing cards in conjunction with a card processing system, wherein the card processing system comprises at least one supply magazine for accommodating the cards to be processed, at least one processing station for applying the data to a respective card, and at least one storage magazine for accommodating properly processed cards, comprising the following steps:

processing cards in said card processing system in accordance with a processing list which includes the data to be applied to the respective cards;

determining whether a card has been properly processed;

storing properly processed cards in a defined sequence;

rejecting cards which are not properly processed;

automatically checking a storage sequence of the properly processed cards; and in the case of detection of a gap in the storage sequence, setting a marking device for identifying the sequence gap.

2. The method according to claim 1, wherein upon the detection of a gap in the storage sequence, automatically requesting a system operator to set said marking device.

3. The method according to claim 2, wherein said marking device setting step comprises the step of storing said marking devices in accordance with a marking list, with each marking device being assigned the card number corresponding to the sequence gap from the list of the cards to be processed.

4. The method according to claim 3, further comprising the step of inserting a properly processed card for which a marking device has been set into the storage sequence and removal of the marking device by automatically determining which marking device is assigned to said properly processed card.

5. The method according to claim 4, wherein said inserting step comprises the step of automatically requesting an operator of the system to insert a properly processed card for which a corresponding marking device is set into the storage sequence upon removal of the marking device.

6. The method according to claim 1, wherein upon the detection of a gap in the storage sequence, the marking device is automatically set via corresponding devices of the system.

7. The method according to claim 6, wherein said marking device setting step comprises the step of automatically marking and inserting an incorrectly processed card into the series of the properly processed cards as a marking device for identifying the sequence gap.

8. The method according to claim 7, wherein said marking device setting step comprises the step of storing said marking devices in accordance with a marking list, with each marking device being assigned the card number corresponding to the sequence gap from the list of the cards to be processed.

9. The method according to claim 8, further comprising the step of inserting a properly processed card for which a marking device has been set into the storage sequence and removal of the marking device by automatically determining which marking device is assigned to said properly processed card.

10. The method according to claim 9, wherein said inserting step comprises the step of automatically requesting an operator of the system to insert a properly processed card for which a corresponding marking device is set into the storage sequence upon removal of the marking device.

11. The method according to claim 1, wherein said marking device setting step comprises the step of storing said marking devices in accordance with a marking list, with each marking device being assigned the card number corresponding to the sequence gap from the list of the cards to be processed.

12. The method according to claim 11, further comprising the step of inserting a properly processed card for which a marking device has been set into the storage sequence and removal of the marking device by automatically determining which marking device is assigned to said properly processed card.

13. The method according to claim 12, wherein said inserting step comprises the step of automatically requesting an operator of the system to insert a properly processed card for which a corresponding marking device is set into the storage sequence upon removal of the marking device.

14. The method according to claim 1, further comprising the step of inserting a properly processed card for which a marking device has been set into the storage sequence and removal of the marking device only after the entire processing list has been executed.

15. The method according to claim 1, wherein upon the detection of a gap in the storage sequence, a marking device in the form of a pointer movable along the storage magazine is automatically set at the gap in the storage sequence.

* * * * *